United States Patent [19]

Buchwald

[11] Patent Number: 5,757,857
[45] Date of Patent: May 26, 1998

[54] HIGH SPEED SELF-ADJUSTING CLOCK RECOVERY CIRCUIT WITH FREQUENCY DETECTION

[75] Inventor: Aaron W. Buchwald, Marshalltown, Iowa

[73] Assignee: The Regents of the University of California, Oakland, Calif.

[21] Appl. No.: 392,958
[22] PCT Filed: Jul. 21, 1994
[86] PCT No.: PCT/US94/08223
§ 371 Date: Mar. 13, 1996
§ 102(e) Date: Mar. 13, 1996
[87] PCT Pub. No.: WO96/03800
PCT Pub. Date: Feb. 8, 1996
[51] Int. Cl.$^6$ .................... H03K 7/06; H03K 9/06
[52] U.S. Cl. ............. 375/271; 375/322; 375/326; 375/327; 375/371; 329/346; 329/306
[58] Field of Search .................... 375/261, 271, 375/279, 322, 324, 326, 327, 329, 344, 343, 354, 371; 329/304, 306, 307, 345, 346

[56] References Cited

U.S. PATENT DOCUMENTS

| | | |
|---|---|---|
| 3,626,298 | 12/1971 | Paine . |
| 4,570,125 | 2/1986 | Gibson . |
| 4,604,755 | 8/1986 | Murray . |
| 4,879,728 | 11/1989 | Tarallo . |
| 4,926,447 | 5/1990 | Corsetto et al. . |
| 4,949,357 | 8/1990 | Sehier . |
| 5,012,494 | 4/1991 | Lai et al. . |
| 5,233,631 | 8/1993 | Labat et al. ............... 375/329 |
| 5,402,449 | 3/1995 | Schultes et al. .......... 375/329 |

Primary Examiner—Don N. Vo
Attorney, Agent, or Firm—Daniel L. Dawes

[57] ABSTRACT

A clock recovery circuit based upon an early-late gate approach is applied to high speed serial communication links using NRZ data. The circuit has no systematic phase offset and therefore requires no external phase adjustment circuits or mechanisms. The circuit is used in high speed integrated receivers for applications including fiber optics, disk-drive read/write electronics, mobile communications and high rate- twisted pair data transmission in multimedia systems. Quadrature samples are obtained and held which follow the shape of the NRZ data transition as a function of phase offset. The data signal is passed through the limiter giving rise to a sawtooth shaped phase error signal. A derivative of the error function is taken to provide a frequency error signal to provide for frequency detection and assistance in frequency acquisition of the phase lock loop circuit generating the recovered clock signal from a variably controlled oscillator.

20 Claims, 12 Drawing Sheets

FIG. 2c — FILTERED DATA AND CLOCK

FIG. 2d — RETIMED DATA AND CLOCK

FIG. 2a — LOW-POWER OPTICAL INPUT DATA

FIG. 2b — NOISE CORRUPTED DATA

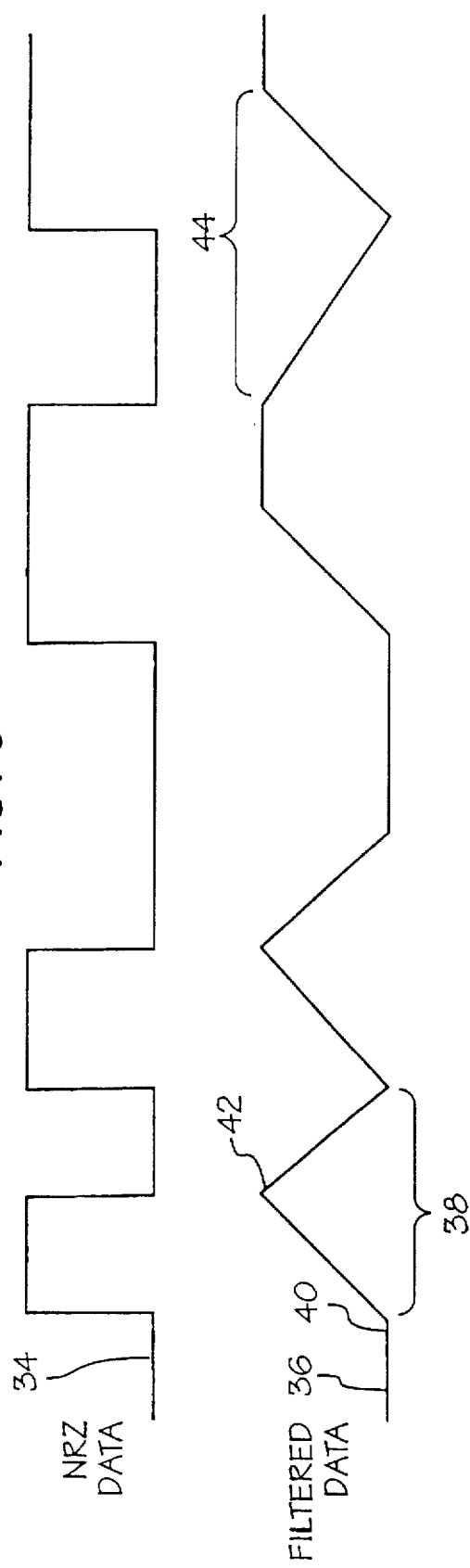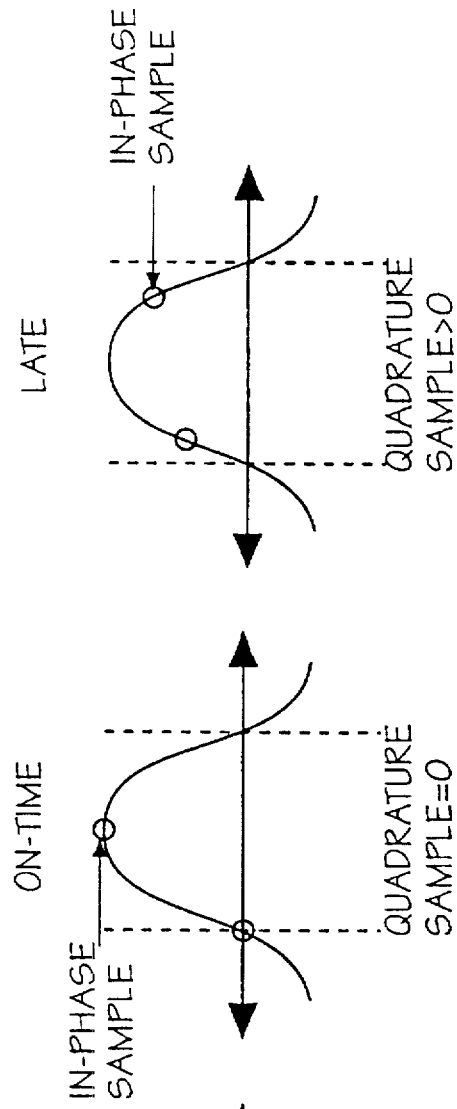

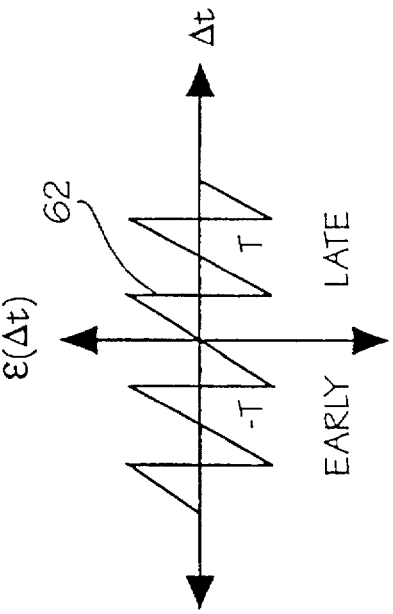
FIG. 11
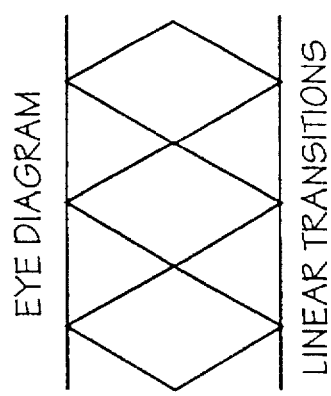
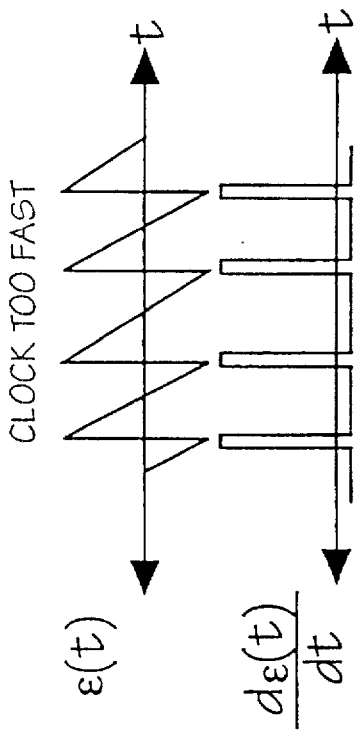
FIG. 12b
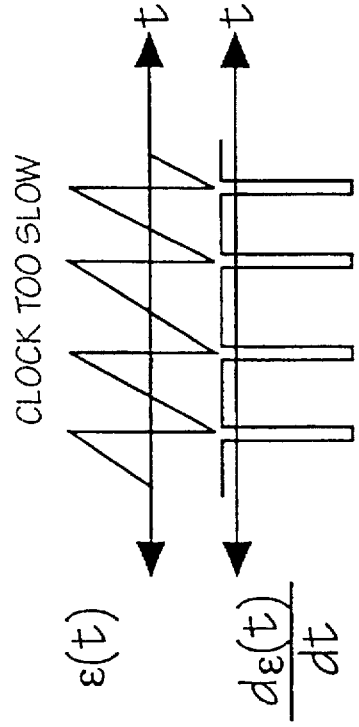
FIG. 12a

HIGH SPEED SELF-ADJUSTING CLOCK RECOVERY CIRCUIT WITH FREQUENCY DETECTION

BACKGROUND OF THE INVENTION

1. Field of the Invention

The invention relates to the field of clock extraction circuits used in digital communication, and in particular, to a high speed self-adjusting clock extraction circuit used with nonreturn-to-zero (NRZ) data.

2. Description of the Prior Art

Communication of information using digital methods is preferable in most instances to analog methods due to the immunity to interference, error correcting channel coding methodologies available, time division multiplexing of signals for increased channel usage, and source coding for efficient information transfer, which is available in the digital format. Whenever information is transmitted digitally, it is broken into a sequence of symbols belonging to a finite alphabet. In order to receive these signals, the receiver must be synchronized with the incoming data such that the information can be sampled at the appropriate time.

Often there is a hierarchy of synchronization that must be performed. For example, in a video system, a receiver must recognize individual bits. Therefore, a clock in a video system must exist at the bit rate to provide bit level synchronization. Bits are ordered into larger groups, called bytes, which in turn are reordered into even still larger groups designated as lines, which in turn are organized into larger groups still defined as frames. For video operation, a receiver must know when the beginning of each frame occurs. Usually, synchronization at the frame and line levels is determined by software and system protocols. However, at the lowest level, bit synchronization must occur, otherwise there will be no intelligible information available to make software controlled decisions at higher levels.

A common modulation format for digital data is the nonreturn to zero (NRZ) format, which is also known on-off keying because the signal is on for one binary state, and off for the other. The binary NRZ signal makes transitions from one binary state to the other only when there is a change in the bit value. For example, the signal 111 in NRZ format will be an unbroken high logic level for three bit intervals. If the signal should then become 1110, a negative transition will occur after three bit intervals and a single bit interval will be at the low logic level where the signal will remain until a logical 1 is again to be represented.

The advantages of NRZ format is that is does not occupy as much bandwidth as other digital formatting schemes, such as return-to-zero (RZ) or Manchester coding. Further, about 90 percent of the signal energy of NRZ data is contained within the bit rate frequency, $B_T$, and about 80 percent of the energy lies within a frequency of $B_{T/2}$. convenient way to picture random digital data is to superimpose sections of the digital signal separated by integer multiples of the bit period T. Such a plot is called an "eye diagram" and illustrates the structure inherent in random data. FIG. 1 is a block diagram of a typical prior art fiber optic receiver, generally denoted by reference numeral 10, associated with eye diagrams of the data and clock signals at various nodes within the circuit. For example, the eye diagram of FIG. 2a is the input data signal provided at input 10 to preamplifier 14. The dispersion of the optical fiber typically band limits the data, therefore, the square wave NRZ data is modeled in this example as having sinusoidal transitions between the high and low logic states. The input signal is shown without noise and is very weak so that it must be amplified by preamplifier 14, where it is unavoidably corrupted by noise so that the form at output 16 appears as shown in the eye diagram of FIG. 2b. The noise of the preamplifier generally determines the overall signal-to-noise ratio of the receiver, as the input signal is weakest at input 12 of receiver circuit 10.

The signal is again amplified by a post-amplifier 18, which performs noise filtering and has an automatic gain control function to keep the input of the clock recovering decision circuit following it at a fixed level. Average power circuit 30 is used in the automatic gain control. FIG. 2c is an eye diagram of the filtered data and recovered clock signal at output 20 of post-amplifier 18. Note that the recovered clock signal undergoes a positive transition 22 at the center of each bit interval. A decision circuit 24 compares the received data with the zero voltage level on every positive zero crossing of 22 of the clock and makes a decision as to the polarity of the bit. This process is known as retiming the data because the weak input signal is cleaned, regenerated and synchronized or retimed to a local clocks The eye diagram of the retimed data and recovered clock are then provided at output 26 of decision circuit 24 as shown in the eye diagram of FIG. 2d. The clock signal is extracted from output 20 by a clock extraction circuit 28 and reinserted into decision circuit 24 for retiming the data. A demultiplexer 32 is coupled to output 26, typically to demultiplex interleaved multiple digital signals transmitted in the fiber optic through circuit 10.

Clearly, recovering a clock signal from random data is crucial to the error-free operation of any receiver circuit. The decision circuit must also sample data at an appropriate time, otherwise its performance will degrade. Because the input data is random, there will be random phase reversals in the data which eliminate any strong spectral component in the data input stream. In fact, there is a spectral null at integer multiples of the bit rate in NRZ formatted data. Therefore, in order to extract a clock from random NRZ data, nonlinear processing of the data signal must occur. Typically the nonlinear operation is based on some form of edge detection, which generates a pulse whenever the data makes a positive or negative transition. Such a detection effectively converts an NRZ data stream into a return to zero (RZ) data stream, which does have a strong spectral component at the bit rate. Once the RZ signal is produced, the clock can be extracted by various means.

Prior art clock extraction circuits from NRZ data can be classified in two main categories: (a) open loop filters; and (b) closed looped synchronizers. Heretofore, open loop filters have almost exclusively been used in high bit rate receivers. In an open loop technique, the periodic tiring information is extracted from the data by first using a nonlinear edge enhancement circuit to generate a spectral line at the bit rate. A signal is then passed through a narrow band filter centered at the bit rate frequency. Typically, surface-acoustic-wave (SAW) filters have been used for this purpose, though commercial embodiments have generally operated at 3 GHz or less. See for example Z. Wang et al., "*Multi Gigabit per Second Silicon Bipolar Clock Recovery IC Optical Receivers,*"IEEE J. Select. Areas Commum Volume SAC-9, pages 256–63 (June 1991).

The open loop technique suffers from instabilities and nonlinear problems, such as frequency acquisition and cycle slipping. Further, open loop systems usually need to be manually adjusted to center the clock edge in the bit interval. A one-time manual adjustment clearly does not track phase offsets due to temperature variations and component aging.

The filter in the open looped circuit is also generally external to the receiver electronics and is bulky, leading to both packaging and interconnection problems.

The closed looped synchronizer is integratable and can continually compensate for changes in the environment and input bit rate. The closed loop system requires a voltage control oscillator (VCO) to be tuned by a suitably filtered error signal in order to align the transitions of the clock to the center of the bit interval. Although a closed loop synchronizer has the ability to be able to track changes in phase and frequency of the data signal, complications arise due to nonlinear frequency acquisition and tracking which makes the circuit difficult to design Clock recovery circuits presently limit the obtainable data rate of multigigabit per second integrated fiber optic receivers.

Currently, practical receivers that include methods of extracting the clock signal from the data are limited to about 25 gigabits per second for open loop systems using a SAW filter for clock extraction such as shown by B. Wedding et al., "2.24 Gigabit Per Second 151-Kilometer Optical Transmission System Using High Speed Integrated Silicon Circuits," IEEE J. Select. Areas Commun., Vol. SAC-8, pages 227–34 (February 1990), and for closed loop synchronizing systems using a phase lock loop such as shown by H. Ransin et al., "A 2.5 Gigabit Per Second Gallium Arsenide Clock and Data Regenerator IC," IEEE Gallium Arsenide IC Symposium, New Orleans, La., Pages 57–60 (October 1990). Many practitioners have been working in the art to produce a 10 gigabit per second integrated fiber optic receiver, but the main stumbling block has been the clock recovery circuit. The clock recovery loop measures the clock-phase and aligns it to minimize the bit error rate. There are notable differences in delays between the edge detection circuit and the decision circuit that result in a steady state phase offset that must be compensated by an additional phase adjustment. Unfortunately, this additional phase adjustment is outside the negative feedback loop and, thus, is typically provided manually via external components.

What is needed then is a design which can be fully integrated without external delay lines used for tuning and which will provide automatic optimal phase alignment of a clock recovery circuit on chip. The integrated design must be a self-correcting clock which includes the decision circuit in the feedback loop for final clock-phase adjustments.

Brief Summary of the Invention

The invention is a clock recovery circuit for establishing bit synchronization with an NRZ data formatted bit stream. The circuit comprises a matched filter for receiving the NRZ bit stream for producing a filtered output signal indicative of edge transitions in the bit stream. A first and second sample and hold circuit have inputs coupled to the matched filter. For the purpose of this specification a sample and hold circuit shall be defined to include any circuit which performs an equivalent function to a sample and hold circuit, such as a tracking and hold circuit. The sample and hold circuits are complementarily clocked by a VCO signal. The first sample and hold circuit holds in-phase samples and the second sample and hold second holds quadrature samples. A third sample and hold circuit having an input coupled to the second sample and hold circuit. The third sample and hold circuit is clocked on positive and negative transitions of a data output signal generated from the first sample and hold circuit. A multiplier multiplies or corrects the sign of the quadrature sample signal output from the third sample and hold circuit. A lowpass filter is coupled to the multiplier and filters output of the multiplier to obtain a DC value of phase error between the data output signal and the quadrature sample or what can be thought of as the data crossover sample. A variable controlled oscillator (VCO) has its control input coupled to the filter. The variable controlled oscillator generates the VCO signal with a controllable phase according to the DC value provided by the filter. The VCO is coupled to the first and second sample and hold circuits to complementarily clock the first and second sample and hold circuits. As a result, a data transition tracking loop is provided which is high speed, inherently self-adjusting, is independent of data transition density with significantly reduced ripple in the error signal generated by the multiplier.

The circuit further comprises a limiter coupled to the output of the first sample and hold circuit. The limiter has its output coupled to the multiplier so that output of the multiplier, which is representative of phase error, is monotonic across the phase error signal centered on a bit interval. The output of the limiter is the data output signal. The phase error signal output by the multiplier is a sawtooth wave form.

The circuit further comprising another limiter coupled to the VCO signal of the VCO for generating a clock signal indicative of a recaptured clock from the data bit stream.

Another embodiment of the circuit further comprising a frequency lock detector for providing a frequency error signal to the VCO. The VCO is responsive to the frequency error signal to shift frequency of the VCO in alignment with bit rate frequency of the data stream prior to phase lock The frequency lock detector is enabled only when absolute value of phase error exceeds a predetermined threshold.

In still another embodiment the circuit is arranged and configured to operate in a bit interleaved fashion so that the first and second sample and hold circuits each comprise a pair of complementarily clocked tracking and hold circuits having their input coupled to the matched filter and a multiplexer having its inputs coupled to outputs of the pair of tracking and hold circuits. The tracking and hold circuits are complementarily clocked by selected outputs from the VCO. The VCO has a lead output, Q, and an lag output, I. The tracking and hold circuits of the first sample and hold circuit are clocked by the lag output from the VCO while the pair of tracking and hold circuits of the second sample and hold circuit are clocked by the lead output from the VCO.

The third sample and hold circuit comprises a pair of complementarily clocked tracking and hold circuits complementarily clocked by the data output signal and having their input coupled to an output of the multiplexer included within the second sample and hold circuit which generates data cross-over samples. A multiplexer is coupled to outputs from the pair of tracking and hold circuits included in the third sample and hold circuit. The multiplexer of the third sample and hold circuit has an output coupled to the filter. An inverter is coupled between an output of one of the tracking and hold circuits and an input of the multiplexer to invert tracked and held data cross-over samples when the tracking and hold circuit coupled thereto is clocked by a negative transition of the data output signal.

The tracking and hold circuits and multiplexers comprising the first, second, and third sample and hold circuits are matched through substantially identical integrated circuit fabrication to inherently null out systematic phase errors within the circuit.

The frequency lock detector comprises a fourth sample and hold circuit comprised of a pair of tracking and hold circuits complementarily clocked by the data output signal each having their inputs coupled to the lowpass filter. A multiplexer has its inputs coupled to outputs of the pair of tracking and hold circuits of the fourth sample and hold circuit. A second lowpass filter has its input coupled to an output of the multiplexer of the fourth sample and hold circuit. A summing node is coupled to the second lowpass filter for differencing with the phase error signal. A limiter has its input coupled to the summing node to generate a frequency error signal.

The circuit further comprises a lock detect gate for breaking connection between the limiter and the lowpass filter when absolute value of the phase error signal is below a predetermined threshold, so that the VCO is controlled only by the phase error below the threshold and by the frequency error above the threshold.

The invention is also a method of recovering a clock signal from an NRZ data bit stream comprising the steps of detecting edge transitions of the NRZ data bit stream. A quadrature sample signal is generated corresponding to the NRZ data bit stream. The quadrature signal is selectively passed to a phase detector output. The quadrature sample signal is passed to the phase detector output if the NRZ data makes a low to high transition. A negative of the quadrature sample signal is passed to the phase detector output if the NRZ data signal makes a high to low transition. Otherwise if the NRZ data signal makes no transition, a previous phase error value is held in the phase detector output. A variably controlled oscillator (VCO) is then controlled according to the phase detector output. A recaptured clock signal is generated by the controlled VCO. As a result, the clock signal is recovered in a self-adjusting circuit with no steady state phase error, ripple induced phase jitter is substantially eliminated, and phase error output is independent of data density and high speed operation is enabled.

The method further comprising the step of generating from the output of the phase error detector a frequency error signal. The frequency error signal is selectively combined with output of the phase detector to control frequency of the VCO to thereby frequency lock to the NRZ data bit stream.

The method further comprising the step of generating a monotonically increasing phase error signal extending across a bit interval centered on zero phase error in the form of a sawtooth wave form for controlling the VCO.

The method further comprises the step of generating from the output of the phase error detector a frequency error signal. The frequency error signal is selectively combined with output of the phase detector to control frequency of the VCO to thereby frequency lock to the NRZ data bit stream.

Finally, the invention can be characterized as a circuit for recapturing a clock signal from an NRZ data bit stream comprising a clocked sample and hold circuit for sampling and holding an in-phase sample signal of the NRZ data bit stream. A clocked sample and hold circuit is also provided for sampling and holding a quadrature sample signal of the NRZ data bit stream. A phase detector circuit selectively passes the quadrature sample signal to a phase detector output. The quadrature sample signal is passed to the phase detector output if the NRZ data makes a low to high transition. The negative of the quadrature sample signal is passed to the phase detector output if the NRZ data makes a high to low transition. The previously passed quadrature sample signal is held at the phase detector output if the NRZ data makes no transition. A variable controlled oscillator circuit receives the phase detector output and responsively generates an in-phase clock signal. The clocked sample and hold circuit for sampling and holding an in-phase sample signal of the NRZ data bit stream and the clocked sample and hold circuit for sampling and holding a quadrature sample signal of the NRZ data bit stream are complementarily clocked by the in-phase clock signal.

The invention and its various embodiments may be better visualized by now turning to the following drawings wherein like elements are referenced by like numerals.

BRIEF DESCRIPTION OF THE DRAWINGS

FIGS. 2a-2d are eye diagrams of a random data and recovered clock signal at various nodes within the circuit of FIG. 1.

FIG. 8 is a simplified timing diagram showing a typical NRZ data stream and its corresponding matched filter output as used in the circuit of FIG. 7.

FIGS. 9a-c are simplified timing diagrams which illustrate the relationship of quadrature sample signals to early, on-time and late in-phase sample and which illustrates that the gradient or slope of the on-time sample is equal to the value of the crossover sample.

FIG. 11 is a timing diagram showing the form of the phase error signal produced in FIG. 10.

FIGS. 12a and 12b are simplified timing diagrams showing the phase error signal and its derivative as a function of time for a slow and fast clock respectively.

The invention and its various embodiments may now be understood by turning to the following detailed description.

DETAILED DESCRIPTION OF THE PREFERRED EMBODIMENTS

Figure 1:
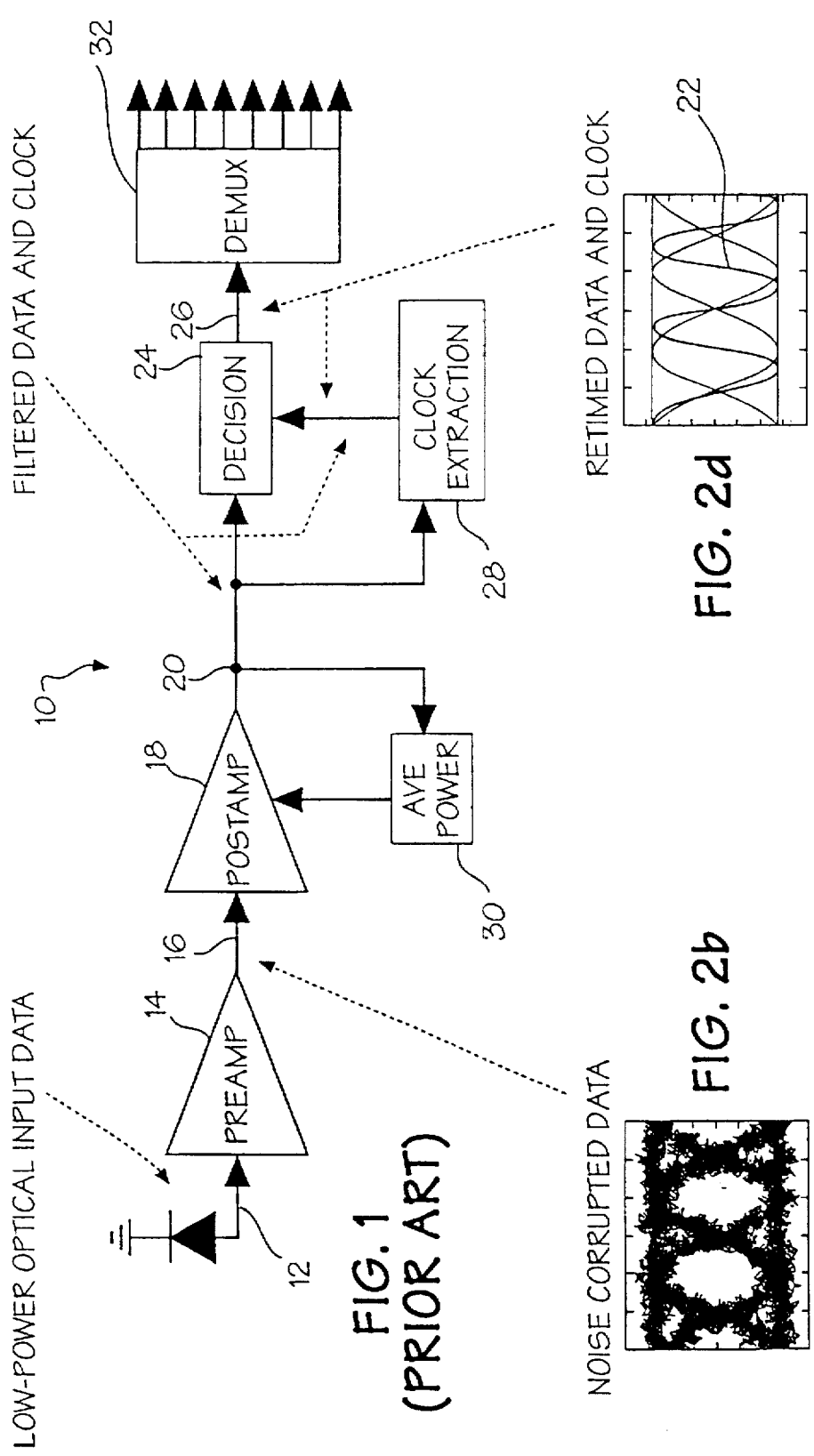
FIG. 1 is a block diagram of a prior art fiber optic receiver.
Figure 3:
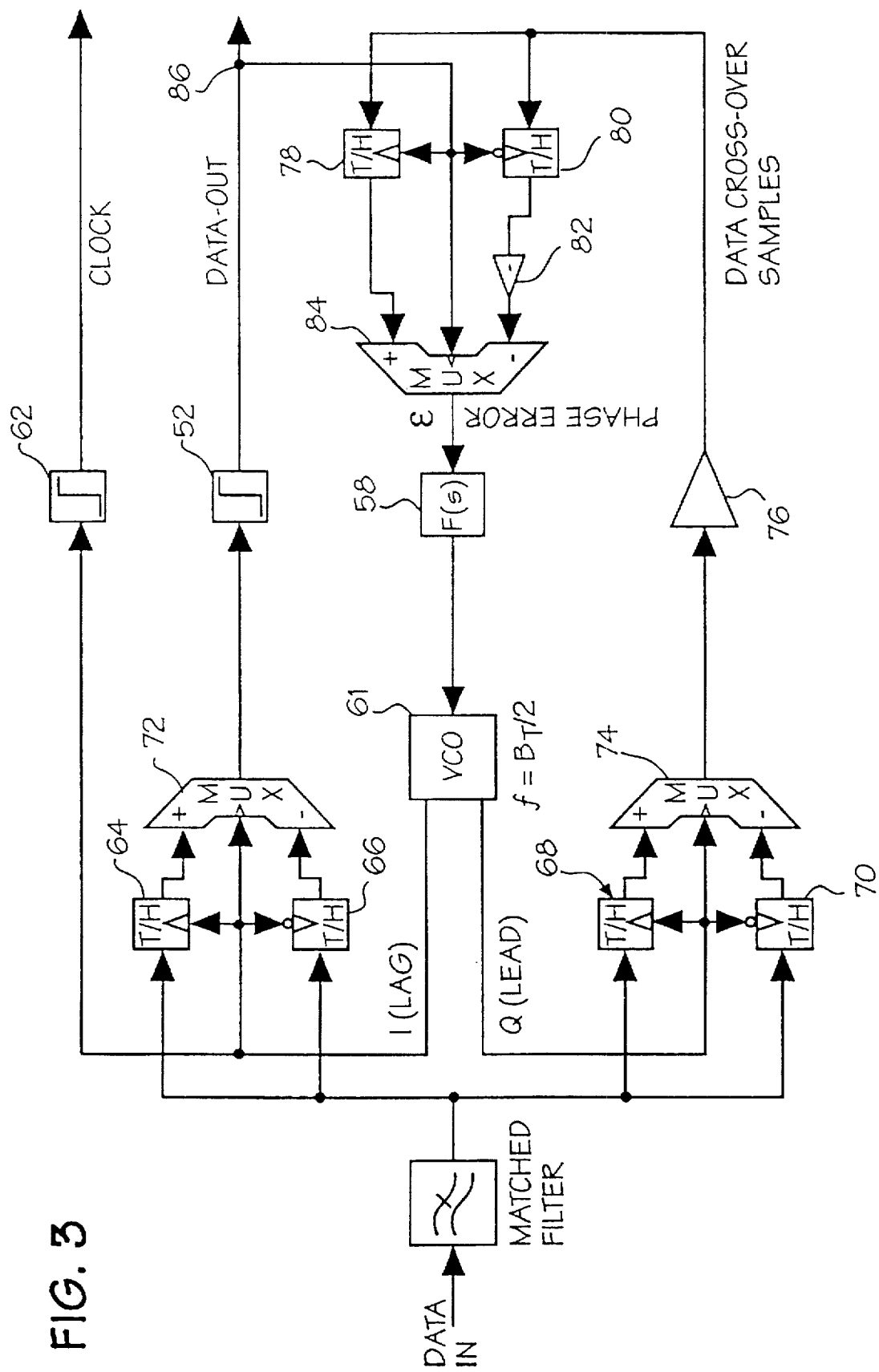
FIG. 3 is a functional block diagram of a circuit incorporating the invention.
Figure 4:
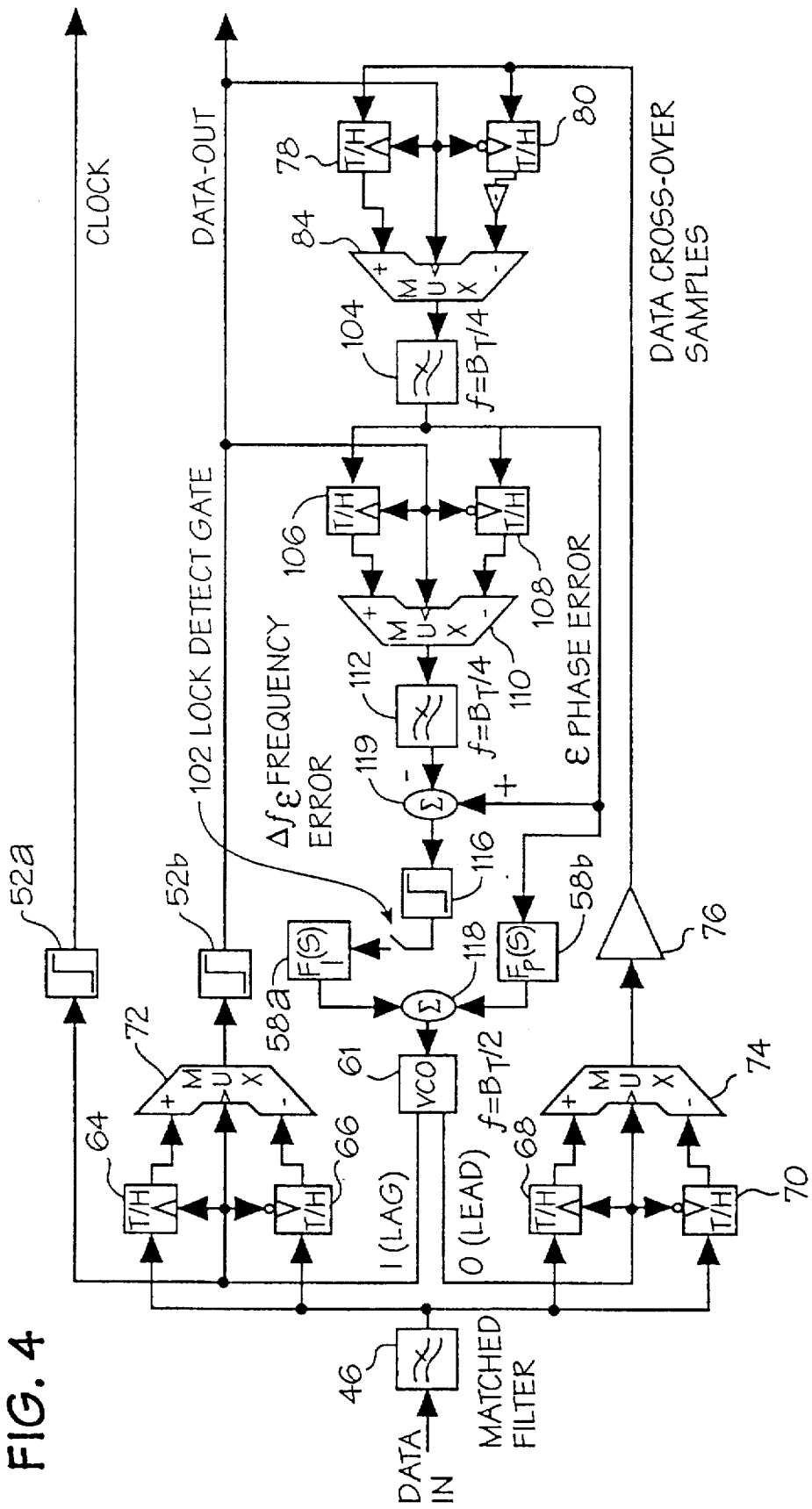
FIG. 4 is a functional block diagram of the circuit of FIG. 3 which has been modified to include a frequency detector and frequency lock loop.

The invention is a clock recovery or extraction circuit. EI the illustrated embodiment, the circuit is used to extract a clock signal from random, nonreturn-to-zero (NRZ) data The general field of application for the circuit is in digital communications and is expected to be particularly useful for high speed, broad band modulation formats, although its use is not restricted to such schemes. A functional block diagram of the illustrated embodiment of the invention is shown and described in connection with FIG. 3. A second embodiment in a modified circuit is shown in the block diagram of FIG. 4. The clock recovery circuit of FIGS. 3 and 4 is designed such that the residual phase-errors between the data signal and the extracted clock signal are minimized. This is accomplished in two ways. First, a negative feedback loop is used to phase lock the extracted the clock to the time varying deviations of the data signal. Second, any residual offsets in the steady state phase error are nulled out by using identical and matching, circuit building blocks in the phase detector.

The clock extraction circuit can also detect frequency differences between the data and the clock signal. This ability to detect frequency differences is used for acquiring an additional phase lock. The frequency error signal is used to drive the clock signal to the correct frequency so that an initial phase lock can occur at start up.

The circuit is capable of performing at very high speeds and is inherently self-adjusting. As stated, it can detect frequency errors to assist in acquisition of initial phase lock. The phase detector function is monotonic over the bit interval thereby improving phase tracking and frequency acquisition. Ripple induced phase jitter is significantly reduced by resampling the phase error only after a data transition. The phase error is independent of the transition density thereby eliminating data pattern dependent jitter. The sensitivity of the circuit is improved by using sample and hold circuits before the decision circuit.

It is expressly contemplated that the circuit will be of utility in fiber optic data links, disk drive read/write electronics, local area networks, and wireless communications. These areas are expected to seek continued growth in the future due to a demand for low cost, low power interconnection of computer networks, mobile data links, and multimedia services, such as video-on-demand, home shopping, home banking, interactive educational programs, and the like.

Figure 5:
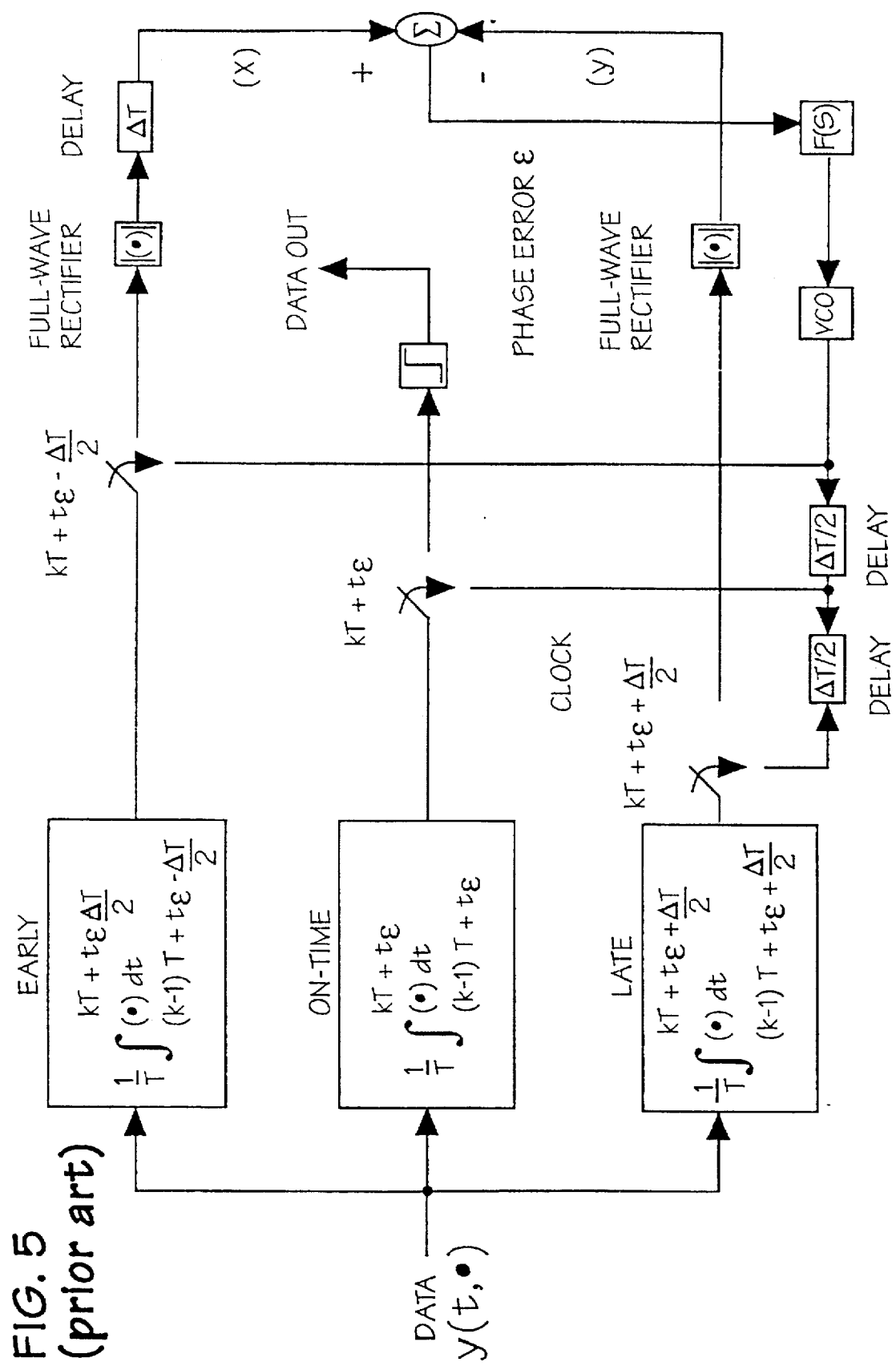
FIG. 5 is a is a functional block diagram of a prior art circuit showing an early-late gate clock recovery circuit design

Before the digital transition tracking loop (DTTL) of the invention is described in connection with FIGS. 3 and 4, it will be helpful to review some background concerning conventional designs with respect to early-late clock recovery circuits. In these circuits, data is detected using an early clock, a late clock, and an on time clock. By subtracting the late from the early clock signal, and multiplying the retimed data to remove polarity variations or unwanted changes in sign, a phase error signal is derived, which will go to zero when the early and late clocks are exactly centered at about the optimal sampling point. FIG. 5 is a functional block diagram of a conventional early-late gate clock recovery circuit using rectifiers in each arm of the circuit. The circuit is well known and discussions of its performance can be found, for example, in Gardner, "Phase Lock Techniques," New York, Wiley, 2d Ed. 1979, at page 235.

If the time delay of the late sample of the current bit is equal to the bit period, then the late sample will occur at exactly the same time as the early sample of the following bit. Therefore, the early timing result can be obtained by delaying the late correlator output, thus, eliminating the early correlator from the circuit of FIG. 5. Based on this assumption, the circuit of FIG. 5 has been simplified to the functional block diagram shown in FIG. 6. This circuit has been described by Stiffler, "Theory of Synchronous Communications," Inglewood Cliffs, N.J., Prentice Hall Inc. 1971 at page 227.

Figure 6:
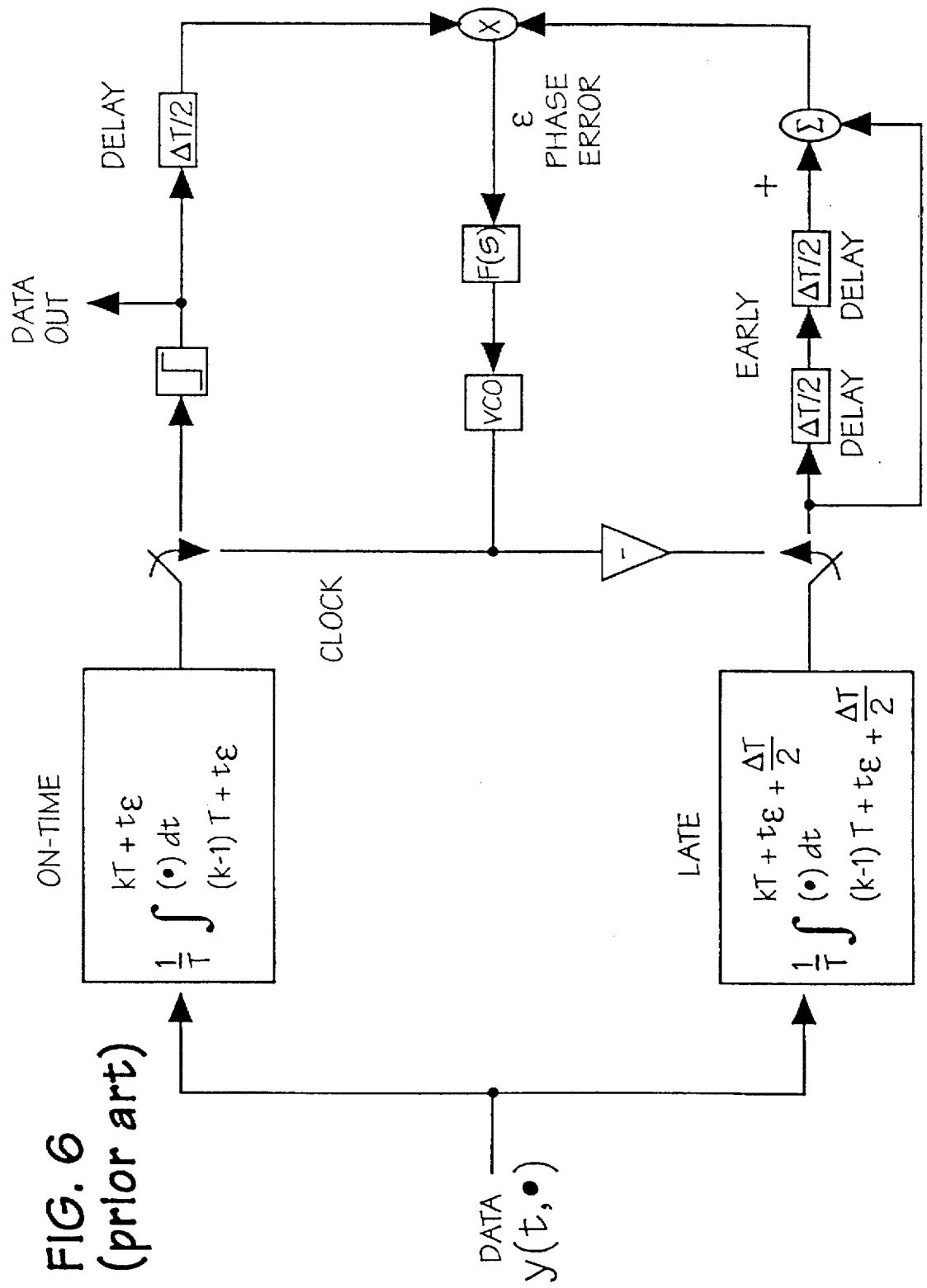
FIG. 6 is a is a functional block diagram of a prior art circuit which is a modification of the circuit of FIG. 5 in which the time delay is equal to the bit interval.
Figure 7:
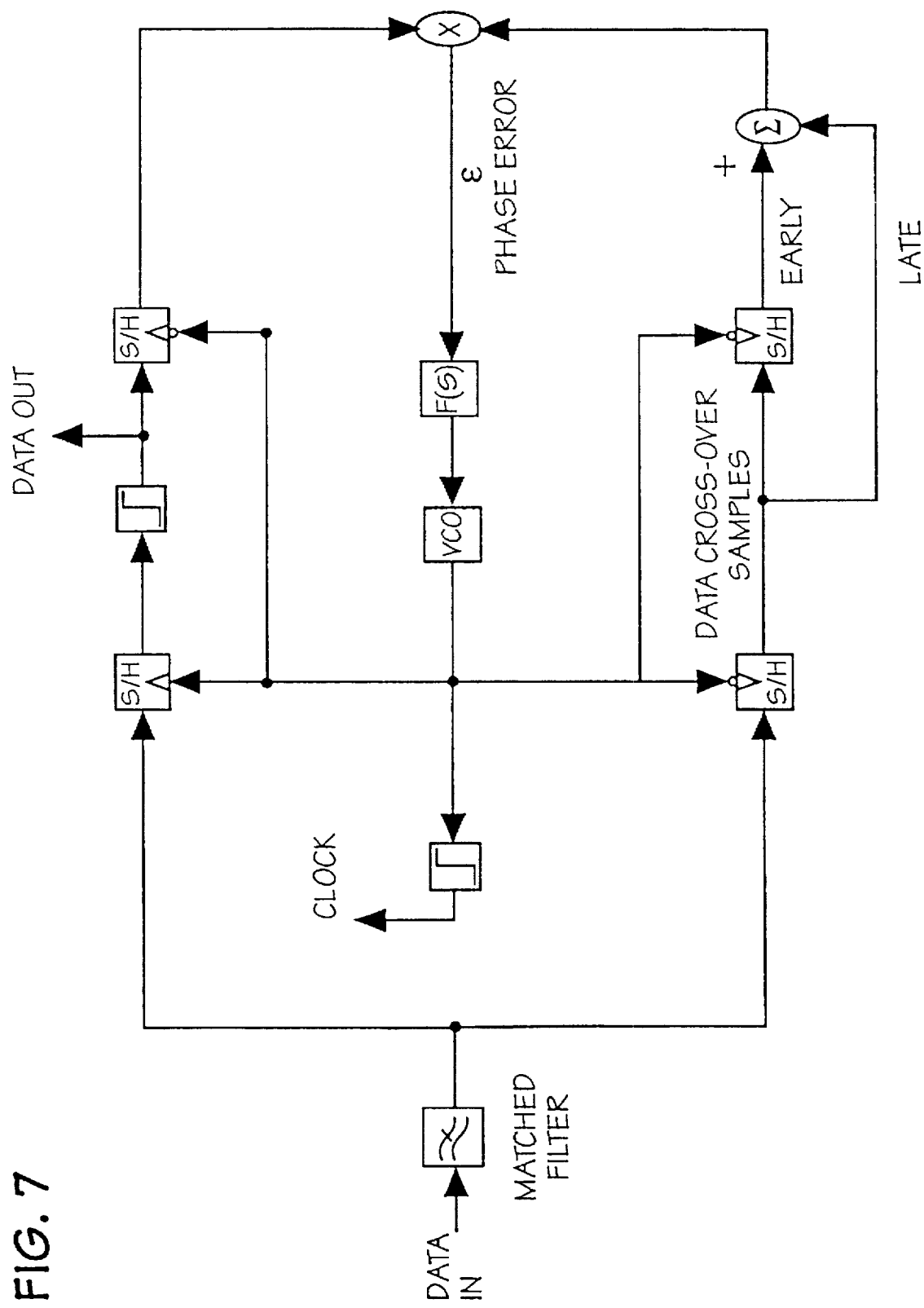
FIG. 7 is a modification of an early-late clock recovery circuit which has been modified according to the invention.

The speed of the circuit of FIG. 6 is limited by the need to perform the integrate and dump functions. However, by replacing the correlators of the circuit of FIG. 6 with a matched filter, a circuit is derived which can be used at high speeds. The functional block diagram of this circuit is shown in FIG. 7. The difficulty with a practical limitation of a circuit describe in FIG. 7 is that some type of assistance is required in frequency acquisition for the initial phase lock. Without this type of assistance, the VCO center frequency of the circuit of FIG. 7 must be stable within 0.1 percent over all processing and temperature variations, which is difficult to meet in practical applications.

It is an inherent feature of NRZ data formatting that timing information for NRZ data is only present when the data make a transition. Therefore, the output of the phase detector between bit intervals can be ignored when no data transition occurs in the bit interval. The phase detector may thereby be shut off by a gating mechanism in absence of data transitions. The modified early-late gate of the invention adds an additional sampling stage to transfer the phase-detector output to the loop filter only when a data transition has occurred. A similar approach was used in an application for clock phase estimates at very low speeds by Paine et al. "Transition Tracking Bit Synchronization System," U.S. Pat. No. 3,626,298 (1971).

The data transition tracking loop of the invention can best be understood by considering its operation in the time domain. FIG. 8 shows a typical rectangular NRZ data pattern on line 34 before and on line 36 after being passed through a matched filter. The matched filter produces a linear transition shown on line 36 that extends over one bit interval. Positive going data transitions produce a linear positive slope and negative going data transitions produce a linear negative slope over one bit interval. Since we are only interested in what happens during data transitions, consider first the positive data pulse 38 shown on line 36 in FIG. 8. Recall that the ultimate goal is to position the phase of the recovered clock so that the sample is taken at the point where the filtered data signal achieves a maximum signal-to-noise ratio. As it turns out, we would like to find the gradient of the on-time samples and force this value to zero. In the case of high speed data communication systems, several parasitic poles near the data rate provide additional filtering of the data. The result is that the data transitions follow nearly a sinusoidal path and for a data pattern of alternately ones and zeros, the data signal is a sine wave at half the bit rate.

For this special case of sinusoidal transitions, the gradient or slope of the on-time samples can be found by shifting the sampling phase half a bit period. Positive data pulse 38 is characterized by a data crossover sampling point 40 and an optimal sampling point 42. This special case is illustrated in FIGS. 9a–c. The phase-shifted sample point or the quadrature sample, which is shifted forward by one quarter of a clock interval (half the bit interval), is shown in the case of an early clock in FIG. 9a, indicating that the quadrature sample is negative; shown for an on-time clock in FIG. 9b indicating the quadrature sample is zero; and in the case of a late clock, in FIG. 9c, indicating that the quadrature is positive, which is also equal to the derivative or gradient of the curve at the in-phase sample point. The opposite condition can be considered when the data pulse is negative such as shown for pulse 44 in FIG. 8, in which case the plurality of the quadrature samples are reversed from those shown in FIGS. 9a–9c. The sign or polarity reversal is removed by multiplying the quadrature samples by the retimed data, if the data is treated as taking the values (1, −1), which is typically the case for NRZ data.

Since the quadrature samples values are transferred to the loop filter only when the data transition occurs, we can obtain the following simple list of rules for obtaining the desired phase error signal.

a If the data makes a low to high transition, pass the quadrature sample to the phase detector output.
b. If the data makes a high to low transition, pass the negative of the quadrature sample to the phase detector output.
c. If the data makes no transition, hold the previous phase error value.

Figure 10:
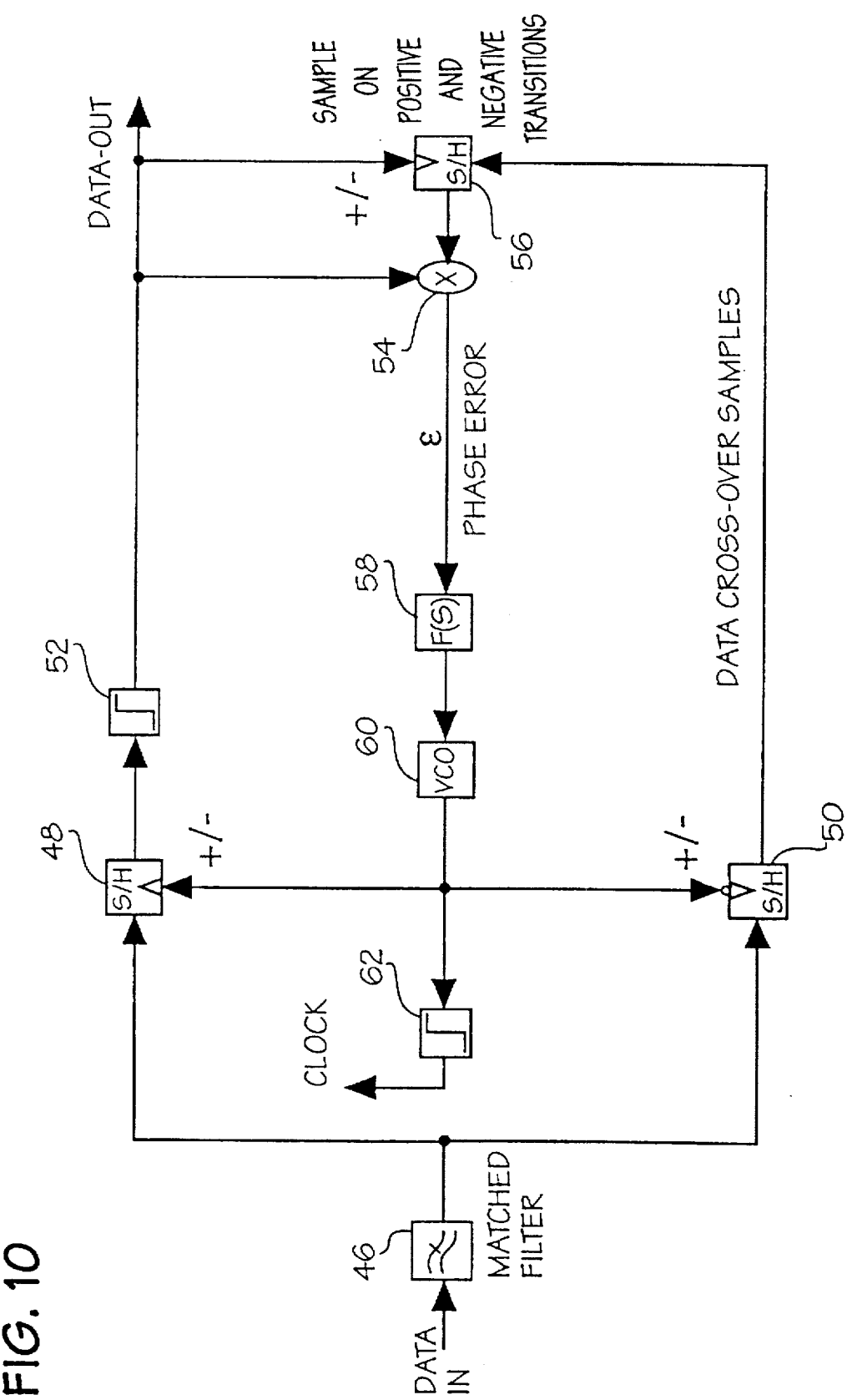
FIG. 10 is a functional block diagram of a digital transition tracking loop (DTTL) of the invention.

The circuits shown in functional block diagram of FIG. 10 implements these rules. It can be seen from this circuit that the quadrature samples follow the data transitions as a function of the phase-offset. The input data is coupled to a matched filter 46 which outputs the data transitions edges. The output of matched filter 46 is coupled to two complementarily clocked sample and hold circuits 48 and 50. Sample and hold circuit 48 is in the in-phase sample arm and is clocked on the positive data transitions. Its output is coupled to a limiter 52. Limiter 52 cleans up the noise from sample and hold circuit 48 and outputs unambiguous high and low logic signals (1, −1). The output of limiter 52 is the data output, is also fed back both to a multiplier 54 for polarity correction of the phase error signal as discussed above, and is used as the clock input of sample and hold circuit 56. The quadrature samples are taken by sample and hold 50 on the negative transition of the clock or what would be considered the cross-over point for an on-time signal. The cross-over samples thus contains the phase error information as was illustrated in FIGS. 9a–c. The phase error information is valid, however, only when a data transition occurs and the polarity of the quadrature signal switches with the data value.

Therefore, the quadrature sample is processed by means of sample and hold circuit 56, which has its input coupled to the output of sample and hold circuit 50. Sample and hold circuit 56 is devised such that it samples on both positive and negative data transitions. As a result, all quadrature samples that are taken by sample and hold circuit 50 will be ignored until a data transition occurs at which time the output will be passed to the phase lock loop after sign reversal if necessary by multiplication by the data signal. The output of sample and hold circuit 56 is coupled to the second input of multiplier 54. The output of multiplier 54 is the phase error signal. The phase error signal is filtered by a low pass filter 58 whose dc output is the error correction signal which is coupled to VCO 60. The phase of the clock generated by VCO 60 is varied in a direction so that the phase error signal is nulled, i.e. phased locked to the true data clock signal. VCO 60 generates the clock for sample and hold circuits 48 and 50 and drives clock output limiter 62 to produce the recovered clock signal Because the data signals pass through limiter 52 before multiplying the quadrature samples in multiplier 54, the plurality of the signal changes abruptly at a cycle-slip boundary, giving rise to a sawtooth-type phase detector characteristic illustrated in the timing graph of FIG. 11. The boundary at which cycle slipping might occur is defined as the cycle-slip boundary. It is the place in the data stream, where for example, synchronization might be suddenly lost and then reacquired, but only at an integer number of bit interval later with the possible loss of the interlying bits.

FIG. 11 shows the phase error signal at the output of multiplier 54 as a function of the time offsets between the data transitions and the clock signal from VCO 60. The sawtooth curve 64 clearly illustrates that the phase detector is monotonic over the entire bit interval [−T/2, T/2] so that the phase error signal follows the shape of the data transition until it abruptly changes sign at the time when the offsets equal to one-half the bit interval.

In a practical implementation in the circuit in FIG. 11, a bit interleaved data transition tracking loop is preferably used as shown in FIG. 3. As is the general practice in this specification, substantially similar elements described in connection with FIG. 10 are referenced with the same reference numerals in FIG. 3. The data again is input into a matched filter 46 and coupled to complementarily clocked track and hold circuits 64, 66, 68 and 70. A sample and hold can only change its value when the clock changes. Therefore you get a staircase type of output from a sample and hold circuit. A single circuit implementation of a sample and hold is difficult to make. A track and hold circuit has two phases: 1) in the first phase it tracks the signal with unity gain; and 2) in the second phase it holds the value that was present at the clock edge. A track and hold circuit can be built in a straight forward way. A sample-and-hold function can be reproduced with two track-and-hold circuits and a multiplexor. In this way, one track-and-hold circuit is tracking while the other track-and-hold circuit is holding and vica versa.

In the present invention two separate track and hold circuits are used to interleave data and to speed up the circuit operation. The only circuit that has to ran at full speed are the multiplexers, which are typically the fastest circuits. The circuit speed is limited then only by one of the fastest types of circuits employed.

The output of track and hold circuits 64–70 are then coupled through corresponding multiplexers 72 and 74. Multiplexer 72 corresponds to track and hold circuit 64 and 66, while multiplexer 74 corresponds to track and hold circuit 68 and 70. The output of multiplexer 74 is then coupled through a buffer circuit 76 to track and hold circuits 78 and 80. The purpose of buffer circuit 76 is to insert a circuit delay to generally match the delay inserted by limiter 52 to the data output signal, so that the quadrature sample input to track and hold circuits 78 and 80 is more or less still time correlated to the data output signal used as the complementary clock signal for track and hold circuits 78 and 80.

The output of track and hold circuit 80 is inverted by inverter 82 to correct polarity reversal since track and hold circuit 80 is clocked on the negative data transition. The output of inverter 82 is coupled to a multiplexer 84 whose other input is coupled to the output of track and hold circuit 78. The output of multiplexer 84 is the phase error signal, coupled as before in the case of FIG. 10 to lowpass filter 58 and thence to VCO 61.

The output of VCO 61 is the clock signal to track and hold circuits 64–70 and is provided through limiter 62 as the recovered clock signal. The output data is coupled from multiplexer 72 through limiter 52 and provided as an output at node 86. The output data is used as the clock signal for multiplexer 84. Multiplexers 72 and 74 are clocked by VCO 61. The I and Q outputs from VCO 61 are 90 degrees out of phase with each other and are separated in time by a half a bit interval, T/2, since VCO 61 generates a clock signal at half the bit rate. I is in phase with the true data clock rate when the phase error is nulled, while Q leads I by an interval of T/2.

VCO 61 operates at a center frequency which is half the data bit rate. The output of VCO 61 is a quadrature output for sampling the data at the data crossover points. The multiplexed track and hold circuits 64-70 perform the function of the sample and hold circuits of FIG. 10 on a bit interleaved basis to sample and hold the data on both positive and negative going clock transitions in the same manner as described in connection with the circuit of FIG. 10. Track and hold circuits 78 and 80 with multiplexer 84 and inverter 82 perform in an bit interleaved manner substantially the same function as sample and hold circuit 56, and multiplier 54 of the circuit of FIG. 10.

Track and hold circuits 64 and 66, together with multiplexer 72, comprises a repeatable structure. Although the resampling circuit, track and hold circuits 78 and 80 with multiplexer 84, has a reverse of polarity for a negative data transition, in for example a fully differential circuit, this is easily realized by switching the polarity of the differential signals. Thus, the layout of the resampling circuit is identical to the front end of the circuit except for a crossover in the wiring. This allows the three sets of track and hold circuits and multiplexer to be fabricated as substantially matched circuit groupings in an integrated circuit.

The phase detector of FIG. 3 operates at very high speeds and since the phase detector and decision portion use identically fabricated integrated circuitry, the sampling phase is inherently self-adjusting. The circuit samples at half the data bit time width, T/2 seconds, offset from the data crossovers. Although this sample point may not be optimal for sinusoidal pulse shapes, for any other pulse shape it achieves a maximum signal-to-noise ratio at the center of the bit interval which is the optimum sampling point.

Since the signal is sampled and held before a decision is made as to whether it is a high or low logic value, the regeneration of the data does not interfere with the data acquisition. Therefore, the signal-to-noise ratio is not adversely effected. In other circuit designs when flip-flops are used to sample and regenerate the data instead of a track and hold circuit, the effect of regeneration on the data sampling makes it unclear as to where the optimum sampling point occurs and thus may not be in the center of the bit interval. This sampling uncertainty reduces receiver sensitivity in those other cases and the present invention is immune from this type of defect A decision circuit must do three things:

1) sample
2) determine whether result of sample is high or low
3) regenerate or latch this result to a stable noiseless voltage level In the present design these operations are separated so access to each intermediate result is possible. Circuits that use a flip-flop get retimed or regenerated data output. However, it's not clear at all where the decision was made as to the proper polarity of the sample, and whether the sample was taken at the right time. The circuit of the invention uses interleaving to increase throughput. How it does this is different, however, from other interleaved circuits because of the sampling operation. In other circuits a D-type flip-flop is used as sampler decision-circuit, and regenerator. These three basic functions can interfere with each other, especially when the clock edge is slow compared to the bit period. The result is that a D-type flip-flop must be quick even if it's interleaved because the input signal is still moving fast even though the clock period is reduced. Therefore interleaving will not actually buy you an increase in speed. In circuit of the invention the limiting element in speed is the track and hold circuit and the multiplexor. But this takes the decision function and regeneration out of the critical path and allows twice the time to perform this function. In the circuit of the invention the sample is also held steady for two bit periods so the latch or regeneration circuit has plenty of time to reach the desired voltage.

The data decision is made after the multiplexor in limiter 52. Because the signal is sampled and held, it is not necessary to have a latch or regenerator to make sure that the bit won't change in the middle of a bit interval. If desired latching can be added after the limiter to further square-up the data-output.

It is contemplated that in a very high-speed system to take advantage of interleaving the decisions will be made in parallel. Therefore a separate path will be provided for each track-and-hold with a limiter and regenerator.

The circuits of FIGS. 3 and 10 have a phase detector output which is monotonic over the bit interval The output is independent of the data transition-density to a first order thereby substantially reducing data pattern dependent jitter in the recovered clock. Resampling the phase error signal at data transitions significantly reduces ripple in the error signal and thereby reduces phase jitter in the recovered clock signal.

The circuit can also be viewed as a modification of a gradient based maximum a posterior (MAP) estimator. See generally Buchwald, "Design of Integrated Fiber Optic Receivers Using Hetero Junction Bipolar Transistors," Ph.D. Thesis, University of California, Los Angeles, (January 1993). Assume that you have a parameter, t, that you want to estimate, and a signal that you are observing y(.). There are two probabilities that are significant for this estimation. We could consider a case where the time offset it by t and we want to find the likelihood that we received a particular y from the sample space y(.). The likelihood is: Pr(y|t) defined as the likelihood.

We could design a receiver that looks at all possible values of t and find the find the particular to that has the largest likelihood. Then we would estimate the time offset as to. This is known as a likelihood test.

We actually want to turn this around, because what we really want to know is the probability that we have a given offset t for a specific value of the received signal y from the sample space y(.). This is known as an a posterior probability and is given by:

Pr(t|y) defined as the A Posterior.

The receiver finds Pr(t|y) for all possible values of t and picks the value $t_o$ which maximizes the A Posterior probability. This is fundamentally different from a likelihood receiver.

However, in the case of a binary system where ones are equally likely to be transmitted as zeros, a MAP receiver and an likelihood receiver are the same thing. In the general case the MAP is more desirable.

The illustrated circuit produces a MAP estimate under nominal operating conditions. It can be shown that an optimal MAP receiver is one that find Pr(t|y) for all values of t and the picks the $t_o$ with the highest probability. It can be shown for additive Gaussian white noise that maximizing Pr(t|y) is the same as maximizing a correlation of the signal with a delayed copy of itself. The idea is to take the original data and correlate that with what was received. Then shift the time slightly and do it again. Repeat this for all values of t. When the data bits line up, the correlation will be minimum. So the value of $t_o$ for this case will be the MAP estimate of the time delay.

The problem with a system that does this is that it is not practical. It implies perfect analog memory and several parallel correlations. A better way to do this operation is to look at the output of the correlator as a function of the time offset. At $t_o$ this function will be a maximum Therefore the receiver looks for the maximum value of this function. We can find the maximum value by taking the slope and finding when that slope is equal to zero. Therefore we have an alternative way to make the receiver. We don't need to perform the correlations, we only need to find the slope of the optimal correlation receiver. We then make a feedback system that drives this slope to be equal to zero. Then we know that we have found the time offset that maximizes the correlation between received bits with copies of the noiseless original data.

The illustrated circuit produces a phase error that is the gradient of the optimal correlation function. Therefore, if used in a feedback system to drive the gradient to zero, the resulting clock signal will occur at a time that is the optimal MAP estimate of data arrival time.

For sinusoidally shaped data transitions, the use of quadrature samples gives the gradient of the optimal correlation. Therefore, the data transition tracking loop provides a MAP clock-phase estimate in steady state operation, provided there is no systematic offset. However, since the systematic offsets are typically the dominant factors responsible for performance degradation of high speed circuits, the primary advantage of these sampled data transition tracking loop is its symmetry, which makes the circuit insensitive to systematic errors. The residual phase-error in recovered clock signal will be a result only of random mismatches in the circuits, which can be reduced or controlled to a high degree of accuracy in an integrated fabrication process.

Consider now frequency detection in the data transition tracking loop of the invention. Notwithstanding the foregoing described advantages, the circuit of FIG. 3 might not be able to lock in to a data signal that has a frequency which differs substantially from the VCO frequency. In fact the natural acquisition of the loop can only pull in frequency errors on the same order of magnitude as the closed looped bandwidth. Since the circuit has a narrow bandwidth to reduce phase jitter (high Q), the pull-in range of the circuit can be quite narrow. For example, at a data rate of 10 gigabits per second, the VCO frequency is 5 GHz. For an effective Q of 1,000, the maximum frequency deviation which can be tolerated is of the order of 10 megahertz or 0.2 percent of the VCO frequency. It may be impractical to design a VCO with a center frequency stable to within 0.2 percent in every application.

Therefore, what is described below is the further modification of the circuitry of FIG. 3 by the inclusion of a frequency detector to ensure frequency acquisition will occur upon startup. Several options for addition of a frequency detector to the circuit of FIG. 3 exists and are included within the scope of the invention. Any of the presently known clock extraction circuits could be used as stand alone frequency detectors to simply add the resulting frequency error to the phase error of the data transition tracking loop circuit. However, since the circuit of FIG. 3 has an in-phase data samples and quadrature crossover samples available to it, the preferred mode is to modify the circuitry of FIG. 3 to include the function of a quadracorrelator.

Figure 13:
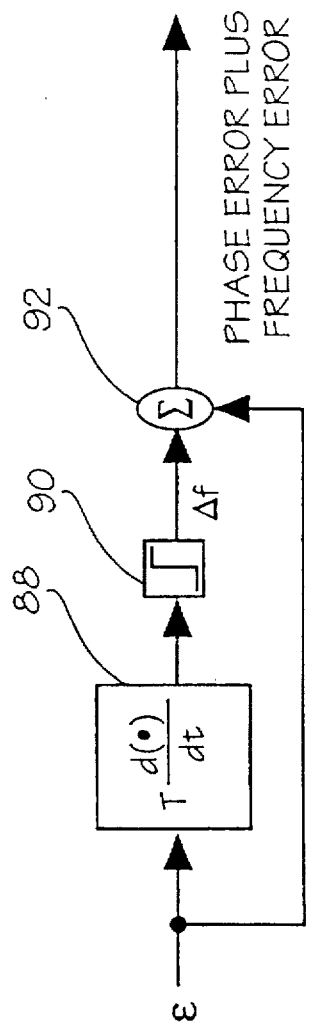
FIG. 13 is a functional block diagram of a circuit for extracting a frequency error signal from a sawtooth phase error signal.
Figure 14B:
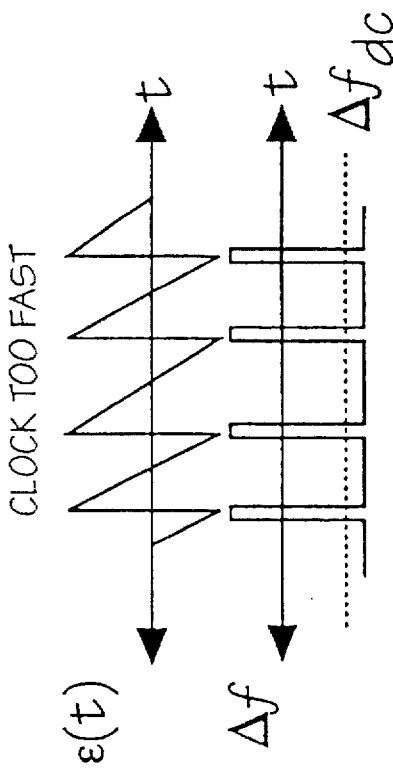
FIGS. 14a and 14b are simplified timing diagrams which show frequency error polarity extraction from a sawtooth phase error signal for a slow and fast clock respectively.
Figure 14A:
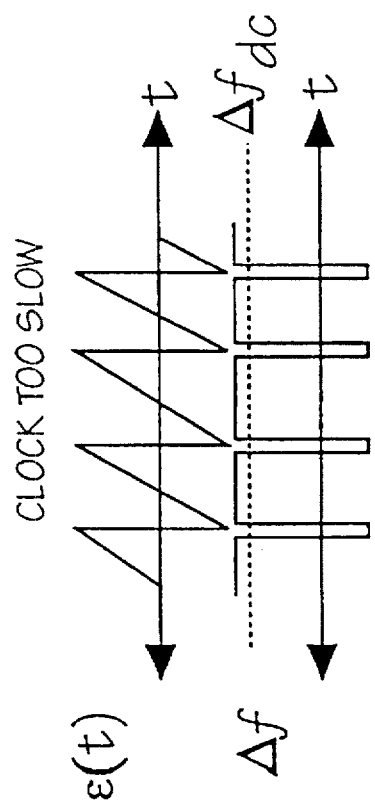

A simple frequency detector can be devised once it is realized that the phase error signal is a sawtooth type function of the error. FIG. 12a illustrates the relationship between the error function and its time derivative for a clock which is too slow, while FIG. 12b illustrates the same relationship when the clock is too fast. The derivative of the error function is in the proper direction or has the proper polarity most of the time. Therefore, to derive a frequency error signal that gives only the sign of the frequency error, we need to only process the derivative by a circuit such as shown in FIG. 13. The error signal e, is coupled to the input of a differentiator 88, whose output is coupled to a limiter 90. The frequency error, which is the output of limiter 90, is added to the error function itself by summing circuit 92 to obtain a signal which is the sum of phase error plus frequency error. This will transform the signal shown in FIGS. 12a and 12b, respectively, to the outputs shown in FIGS. 14a and 14b.

The data transition tracking loop is ideal for implementing sawtooth frequency detection because the error signal is resampled and contains virtually no ripple.

Therefore, only a broad band low pass filter is needed to smooth glitches before producing the desired sawtooth function. The data transition tracking loop can thus recognize frequency errors of at least 10 to 20 percent to provide a significant range over which VCO center frequencies can vary and still be pulled in by the circuit.

Once it is understood that the slope of the sawtooth phase characteristic can give the direction of the frequency error, then the use of various gating techniques and other embellishments to the frequency detector can be incorporated to improve its performance. FIG. 4 illustrates the basic structure of a practical data transition tracking loop with frequency detection. FIG. 4 is a modification of the circuit of FIG. 3 in which a frequency detector has been included in the feedback path.

Considerations of closed loop stability and jitter peaking dictate the gain and transfer function of the frequency filter 58a in the frequency error path.

When the loop is in lock, the average frequency error will go to zero. However, it will vary randomly, and can disturb the dynamics of the phase-frequency lock loop. To reduce the effect of the frequency error signal on the loop when in phase lock, a lock detector can be used to force the frequency to zero after the phase acquisition is complete. One technique is the use of a dead zone near the point of zero phase error.

Figure 15:
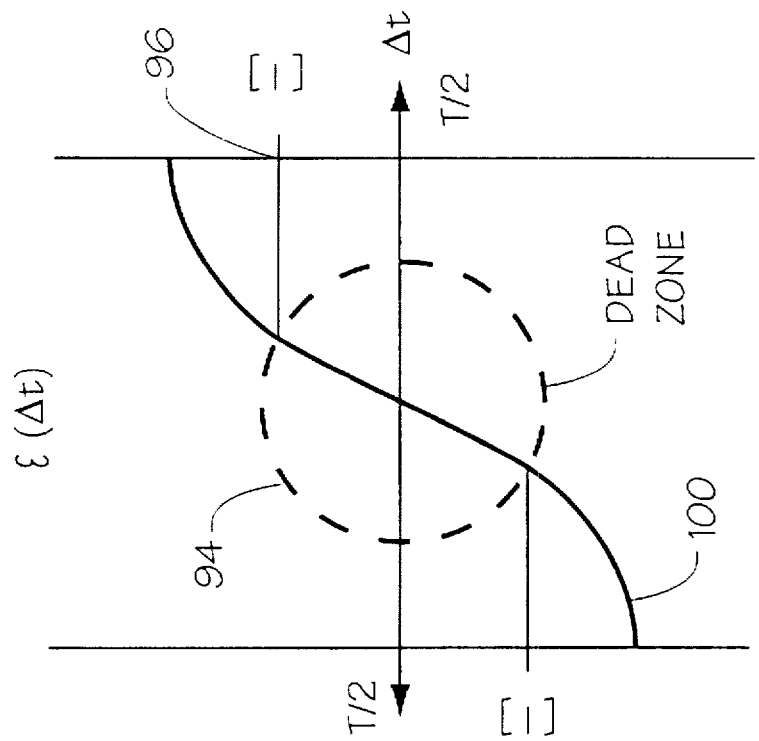
FIG. 15 is a graph illustrating dead-zone control for the generation of a frequency error signal.

This is described in connection with FIG. 15. The frequency error is enabled only when the phase error exceeds a given threshold. FIG. 15 is a graph showing plus and minus time error margins within the data bit width in which there is a dead zone 94 such that the frequency error is not enabled until the thresholds 96 or 98 are exceeded or reaches a point on curve 100 out of dead zone 94.

Figure 16:
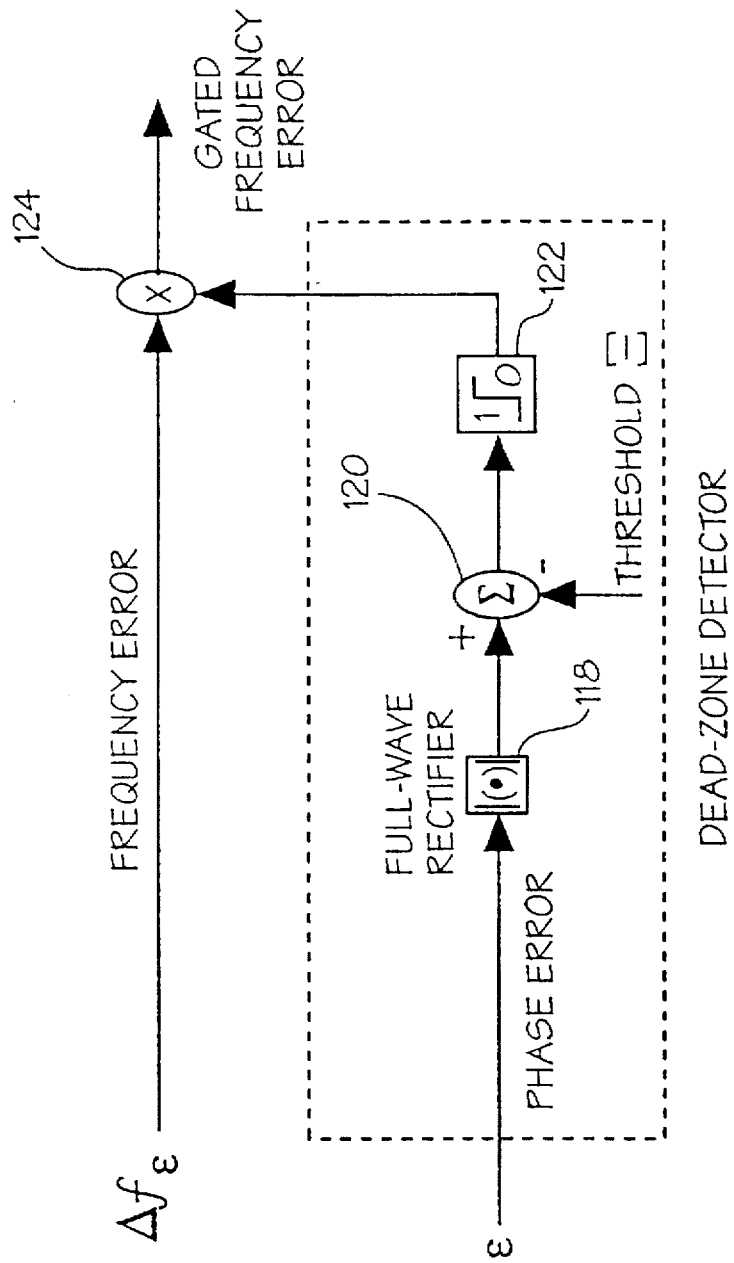
FIG. 16 is a functional block diagram of a circuit for implementing the deadzone control shown in FIG. 15.

The circuit of FIG. 16 is a functional block diagram by which the control technique of FIG. 15 is implemented. The phase error to coupled to a full wave rectifier 118 to provide the absolute value of the phase error. A predetermined threshold value is subtracted from the absolute value of the phase error in a summing node 120 with the difference being converted to a (0, 1) logic level by limiter 122. The output of limiter 122 is coupled to multiplier 124 where it multiplies the frequency error signal. Because limiter 122 generates either only a 0 or a 1, multiplier acts as a dead zone switch, so that the circuit of FIG. 16 is symbolically denoted in FIG. 4 as switch 102.

With this technique, the operation of frequency acquisition can be separated from phase tracking. During frequency acquisition, the average phase error signal will nominally equal zero and will have no effect on the loop. During frequency acquisition the loop will not be locked. Therefore the phase error will continually slip cycles and rotate through [−pi, pi] in terms of clock phase or [−T/2, T/2] in terms of bit period times. The phase will look like a linearly increasing quantity for a constant frequency error. Therefore the output of the phase detector with a constant frequency error will look like FIG. 11 as a function of time. This signal has an average value of zero. It will get lowpass filtered by the circuit elements and the resulting output signal is nominally zero (zero dc value) with some ac ripple due to imperfect suppression of the high frequency contents from the loop filter. Once frequency acquisition has been established, the phase error signal takes over and the frequency error feedback path is broken, indicated symbolically in the circuit of FIG. 4 by switch 102.

What has been added to the circuitry of FIG. 4 is the addition of a broadband lowpass filter 104 coupled to the output of multiplexer 84. The output of filter 104 has a frequency one-quarter the frequency of the bit rate. The output of filter 104 is then provided as inputs to track and hold circuits 106 and 108. The output of circuits 106 and 108, in turn, are coupled to the inputs of multiplexer 110, whose output again is coupled to a lowpass filter 112. The output of filter 112 is differenced at summing node 114 with the phase error. The output from node 114 is then coupled through limiter 116 and provided to the switched locked detect gate 102. The output of filter 104, which represents the phase error, is also coupled to the input of a phase filter 58b. The output of frequency filter 58a and phase filter 58b are then summed at summing node 118 and provided to the input of VCO 61. The remaining elements of the circuit of FIG. 3 are identical or substantially similar to similarly numbered elements shown and described in connection with FIG. 3.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. A clock recovery circuit for establishing bit synchronization with an NRZ data formatted bit stream comprising:

a matched filter for receiving said NRZ data formatted bit stream for producing a filtered output signal indicative of edge transitions in said NRZ data formatted bit stream;

first and second sample and hold circuits having inputs coupled to said matched filter, said sample and hold circuits being complementarily clocked by a VCO signal to hold quadrature samples, said first sample and hold circuit for generating an in-phase data output signal;

a third sample and hold circuit having an input coupled to said second sample and hold circuit, said third sample and hold circuit being clocked on positive and negative transitions of said in-phase data output signal and generating a data crossover sample;

a multiplier for multiplying said in-phase data output signal with output from said third sample and hold circuit;

a lowpass filter coupled to said multiplier for filtering output of said multiplier to generate a DC value of a phase error signal proportional to any phase error between said in-phase data output signal and said data crossover sample; and a variable controlled oscillator (VCO) having its control input coupled to said low ass filter, said variable controlled oscillator generating said VCO signal with a controllable phase according to said DC value provided by said lowpass filter, said VCO being coupled to said first and second sample and hold circuits to complementarily clock said first and second sample and hold circuits, whereby a data transition tracking loop is provided which is high speed, inherently self-adjusting; is independent of data transition density with significantly reduced ripple in said phase error signal generated by said multiplier.

2. The circuit of claim 1 further comprising a first limiter coupled to the output of said first sample and hold circuit, said first limiter having an output coupled to said multiplier so that output of said multiplier representative of said phase error is monotonic across said phase error signal centered on a bit interval, said output of said limiter being said in-phase data output signal.

3. The circuit of claim 2 wherein said phase error signal output by said multiplier is a sawtooth wave form.

4. The circuit of claim 1 further comprising a limiter coupled to said VCO signal of said VCO for generating a clock signal indicative of a recaptured clock from said NRZ data formatted bit stream.

5. The circuit of claim 2 further comprising a second limiter coupled to said VCO signal of said VCO for generating a clock signal indicative of a recaptured clock from said NRZ data formatted bit stream.

6. The circuit of claim 2 further comprising a frequency lock detector for providing a frequency error signal to said VCO, said VCO being responsive to said frequency error signal to shift frequency of said VCO in alignment with bit rate frequency of said NRA data formatted bit stream prior to phase lock.

7. The circuit of claim 6 wherein said frequency lock detector is enabled only when absolute value of phase error exceeds a predetermined threshold.

8. The circuit of claim 3 further comprising a frequency lock detector for providing a frequency error signal to said VCO, said VCO being responsive to said frequency error signal to shift frequency of said VCO in alignment with bit rate frequency of said NRZ data formatted bit stream prior to phase lock.

9. The circuit of claim 1 arranged and configured to operate in a bit interleaved fashion so that said first and second sample and hold circuits each constitute a pair of complementarily clocked tracking and hold circuits having their input coupled to said matched filter and a multiplexer having its inputs coupled to outputs of said pair of tracking and hold circuits, said tracking and hold circuits being complementarily clocked by selected outputs from said VCO, said VCO having a lead output, Q, and an lag output, I, said tracking and hold circuits of said first sample and hold circuit being clocked by said lag output from said VCO while said pair of tracking and hold circuits of said second sample and hold circuit are clocked by said lead output from said VCO.

10. The circuit of claim 9 wherein said third sample and hold circuit constitutes:

a pair of complementarily clocked tracking and hold circuits complementarily clocked by said in-phase data output signal and having their input coupled to an output of said multiplexer included within said second sample and hold circuit which generates data crossover samples;

a multiplexer coupled to outputs from said pair of tracking and hold circuits included in said third sample and hold circuit, said multiplexer of said third sample and hold circuit having an output coupled to said lowpass filter; and an inverter coupled between an output of one of said tracking and hold circuits and an input of said multiplexer to invert tracked and held data crossover samples when said tracking and hold circuit coupled thereto is clocked by a negative transition of said data output signal.

11. The circuit of claim 10 wherein said tracking and hold circuits and multiplexers comprising said first, second and third sample and hold circuits are matched through substantially identical integrated circuit fabrication to inherently null out systematic phase errors within each of said sample and hold circuits.

12. The circuit of claim 11 further comprising a frequency lock detector for providing a frequency error signal to said VCO, said VCO being responsive to said frequency error signal to shift frequency of said VCO in alignment with bit rate frequency of said NRZ data formatted bit stream prior to phase lock.

13. The circuit of claim 12 wherein said frequency lock detector comprises a fourth sample and hold circuit comprised of:

a pair of tracking and hold circuits complementarily clocked by said inphase data output signal each having their inputs coupled to said lowpass filter;

a multiplexer having its inputs coupled to outputs of said pair of tracking and hold circuits of said fourth sample and hold circuit;

a second lowpass filter having its input coupled to an output of said multiplexer of said fourth sample and hold circuit;

a summing node coupled to said second lowpass filter for differencing with said phase error signal; and a limiter having its input coupled to said summing node to generate a frequency error signal.

14. The circuit of claim 13 further comprising a lock detect gate for breaking connection between said limiter and said lowpass filter when absolute value of said phase error signal is below a predetermined threshold, so that said VCO is controlled only by said phase error below said threshold and by said frequency error above said threshold.

15. A method of recovering a clock signal from an NRZ data bit stream comprising the steps of:

detecting edge transitions of said NRZ data bit stream;

generating a quadrature sample signal corresponding to said NRZ data bit stream;

selectively passing said quadrature sample signal to a phase detector output, said quadrature sample signal being passed to said phase detector output if said NRZ data makes a low to high transition, a negative of said quadrature sample signal being passed to said phase detector output if said NRZ data signal makes a high to low transition, otherwise if said NRZ data signal makes no transition, holding a previous phase error value in said phase detector output;

controlling a variably controlled oscillator (VCO) according to said phase detector output; and generating a recaptured clock signal by said controlled VCO, whereby said clock signal is recovered in a self-adjusting circuit with no steady state phase error, whereby ripple induced phase jitter is substantially eliminated, whereby phase error output is independent of data density and high speed operation is enabled.

16. The method of claim 15 further comprising the step of generating from said output of said phase error detector a frequency error signal, said frequency error signal being selectively combined with output of said phase detector to control frequency of said VCO to thereby frequency lock to said NRZ data bit stream.

17. The method of claim 15 further comprising the step of generating a monotonically increasing phase error signal extending across a bit interval centered on zero phase error for controlling said VCO.

18. The method of claim 17 wherein the step of generating said monotonically increasing phase error signal generates a sawtooth wave form.

19. The method of claim 18 wherein said frequency error signal is generated from said sawtooth wave form and further comprising the step of generating from said output of said phase error detector a frequency error signal, said frequency error signal being selectively combined with output of said phase detector to control frequency of said VCO to thereby frequency lock to said NRZ data bit stream.

20. A circuit for recapturing a clock signal from an NRZ data bit stream comprising:

clocked sample and hold circuit means for sampling and holding an in-phase sample signal of said NRZ data bit stream;

clocked sample and hold circuit means for sampling and holding a quadrature sample signal of said NRZ data bit stream;

phase detector circuit means for selectively passing said quadrature sample signal to a phase detector output, said quadrature sample signal being passed to said phase detector output if said NRZ data makes a low to high transition, the negative of said quadrature sample signal being passed to said phase detector output if said NRZ data makes a high to low transition, and previously passed quadrature sample signal being held at said phase detector output if said NRZ data makes no transition; and variable controlled oscillator means for receiving said phase detector output and responsively generating an in-phase clock signal, said clocked sample and hold circuit means for sampling and holding an in-phase sample signal of said NRZ data bit stream and said clocked sample and hold circuit means for sampling and holding a quadrature sample signal of said NRZ data bit stream being complementarily clocked by said inphase clock signal.

* * * * *